Oct. 7, 1947.  J. BOYER  2,428,647
DUAL TRANSMISSION GEARSHIFT MECHANISM
Filed May 19, 1944  2 Sheets-Sheet 1

INVENTOR.
Joseph Boyer
BY
Barnes, Kisselle, Laughlin & Raisch
Attorneys

Oct. 7, 1947.  J. BOYER  2,428,647
DUAL TRANSMISSION GEARSHIFT MECHANISM
Filed May 19, 1944  2 Sheets-Sheet 2
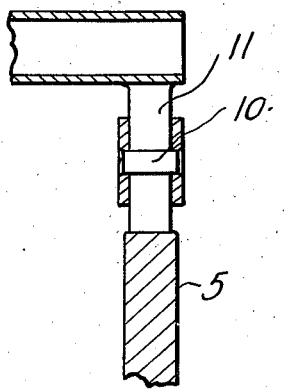
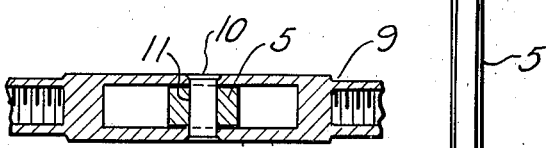
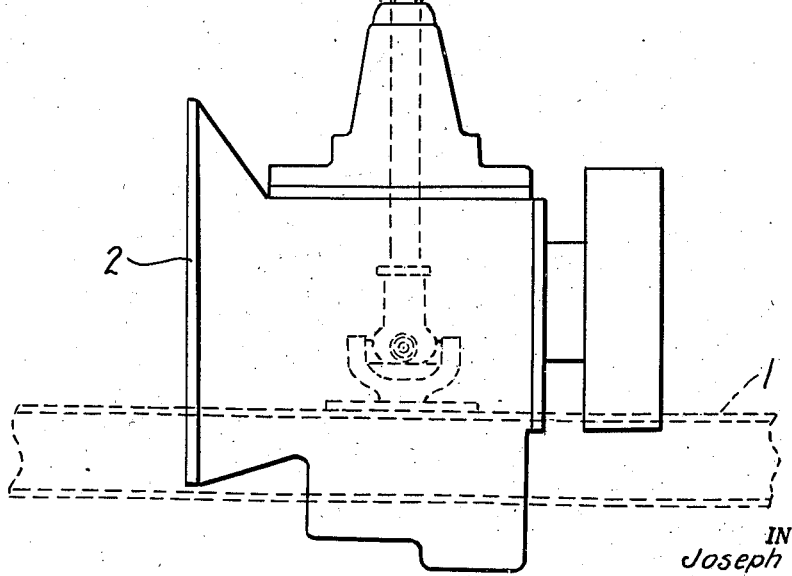
INVENTOR.
Joseph Boyer
BY
Barnes, Kisselle, Laughlin & Raisch
Attorneys

UNITED STATES PATENT OFFICE 2,428,647

DUAL TRANSMISSION GEARSHIFT MECHANISM

Joseph Boyer, Detroit, Mich., assignor of one-half to Lloyd Lawson, Dearborn, and one-half to Anthony J. D'Anna, Wyandotte, Mich.

Application May 19, 1944, Serial No. 536,303

8 Claims. (Cl. 74—473)

This invention relates to a gear shift lever arrangement for two transmissions.

It is common practice to have motor trucks driven by two separate internal combustion engines each provided with independent selective sliding gear transmissions. In such an automotive vehicle having a dual motor drive it is desirable to have the transmissions for each of the motors shifted simultaneously from one gear to another so that each of the transmissions will be operating simultaneously in the same gear or speed.

It is the object of this invention to produce a lever arrangement for simultaneously shifting gears in a plurality of transmissions in a single operation which is simple in structure and dependable in operation.

In the drawings:

Fig. 2 is a side elevation of my gear shift lever arrangement.

Figure 1:
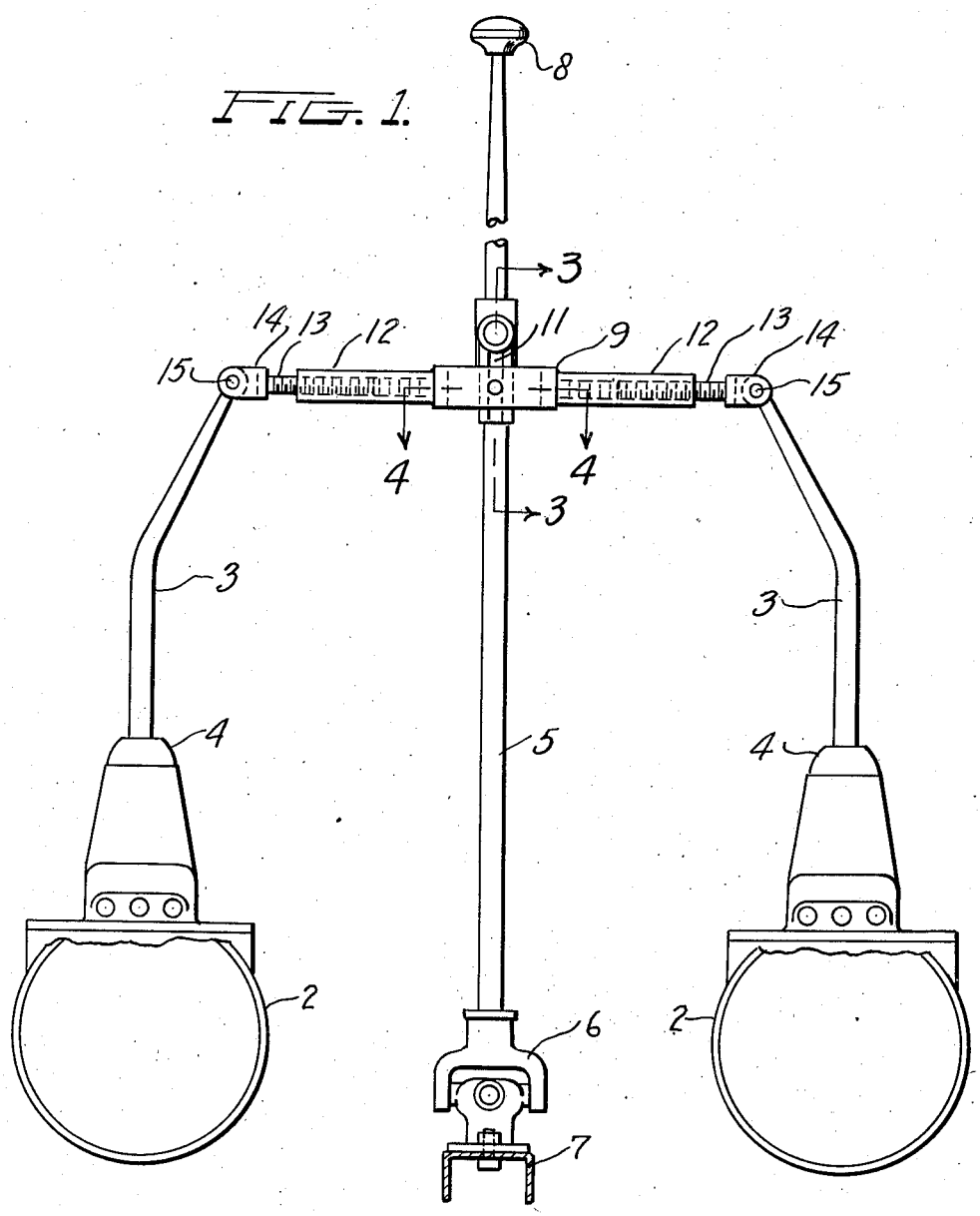
Fig. 1 is a front elevation showing my plural transmission gear shift arrangement.

Figs. 3 and 4 are sections along the lines 3—3 and 4—4 of Fig. 1.

In the drawings 1 designates the frame of a truck or automotive vehicle of the type which is driven by two internal combustion engines. Each of the motors is provided with a separate transmission generally designated 2. Transmissions 2 are not shown in detail because they can be any conventional selective sliding gear transmission which can be shifted into a plurality of speeds or gears such as first, second, third and fourth gears as well as reverse gear, to vary the driving ratio between the engine and the rear driving wheels in the well-known and conventional manner.

For purposes of shifting the transmissions 2 into various speeds each transmission is provided with a gear shift lever 3 which is pivoted with a ball and socket pivot as at 4 on the transmission housing. Levers 3 are arranged to pivot or shift about their pivots 4 in a conventional manner to change the gear ratio of the transmission. For simultaneously shifting levers 3 there is provided a main gear shift lever 5 which is mounted at its lower end upon a universal joint 6 fixed to a frame member 7 of the vehicle. The upper end of lever 5 is provided with the usual knob 8. Thus lever 5 is free to shift universally upon its support 7.

Levers 3 are connected to each other and to lever 5 by a link 9. Link 9 is pivotally connected to lever 5 by a pin 10 which passes through slot 11 in lever 5. Thus link 10 is free to swivel on pin 10 as an axis and also to move up and down in slot 11.

Link 9 comprises two tubular portions 12 which are internally threaded and which have a screw or threaded fit with the externally threaded rods 13. The ends of rods 13 are bifurcated as at 14. Pins 15 pass through eyes in the upper ends of levers 4 and are fixed in bifurcated ends 14 of rods 13. Thus pins 15 pivotally connect rods 13 with the upper ends of levers 3.

The operation of the device is as follows: The gear shift arrangement is shown in neutral position. If it is desired to shift the transmission into low gear, for example, lever 8 will be swung to the left and rearwardly about universal joint 6. As gear shift lever 5 swings to the left, link 9 will transmit a similar movement to each of the gear shift levers 3. Since the upper end of left hand gear shift lever 3, Fig. 1, will be traveling upwardly about an arc and the upper end of right hand gear shift lever 3 will be traveling downwardly about an arc, this will cause link 9 to swivel in slot 11. As lever 5 is shifted rearwardly, that is, to the left, Fig. 2, the upper ends of levers 3 will swing rearwardly and downwardly about arcs having their centers at fulcrums 4, whereas lever 5 will swing about an arc having its center at universal joint 6. Although these levers shift about different centers there will be no bind because pin and slot connection 10, 11 between link 9 and lever 5 will permit the link 9 to move up and down relative to lever 5 as shifting necessitates and similarly this connection 11, 15 will permit link 9 to swivel about lever 5 as necessitated for shifting movement.

The pin and slot connection 10 and 11 between lever 5 and link 9 permits link 9 to swivel and to shift upwardly and downwardly in a vertical plane but does not permit link 9 to swing in a horizontal plane. This is evident from the showing in Fig. 4. This arrangement is necessary so that the levers 3 will always shift forwardly and rearwardly simultaneously and to the same extent. However, since levers 3 shift about pivots 4 which are positioned above the universal joint 6 about which lever 5 swings, rotary movement must occur between link 9 and the upper ends of levers 3. To take care of this relative rotary movement rods 13 are free to rotate in tubes 12 due to the threaded or screw fit of rods 13 in tubes 12.

I claim:

1. Shifting mechanism for shifting the gears of a plurality of transmissions to change the speed of said transmissions comprising a separate gear shift lever for each transmission, a main gear shift lever for controlling the simultaneous shifting of the separate shift levers of each transmission, a cross link mounted on said main gear shift lever, pivotal connections between said link and said separate gear shift levers, and a shiftable pivotal connection between said link and main lever whereby said link can both swivel and shift on said main lever in a vertical plane only upwardly and downwardly, the vertical distance from the pivots of the separate shift levers to said link being shorter than the corresponding distance on the main shift lever, whereby upon shifting said main gear shift lever a similar and simultaneously shifting of said separate gear shift levers is effected to change the speed of said transmissions.

2. Shifting mechanism for shifting the gears of a plurality of transmissions to change the speed of said transmissions comprising a separate gear shift lever for each transmission, a main gear shift lever positioned between said other gear shift levers and for controlling the simultaneous shifting of the separate shift levers of each transmission, a pivot for each of said gear shift levers, the pivot for the main shift lever being offset from the pivots for the other gear shift levers, a rigid link supported on said separate gear shift levers, pivotal connections between said link and said separate gear shift levers, and a shiftable pivotal connection between said link and main lever whereby said link can both swivel and shift on said main lever in a vertical plane only upwardly and downwardly, the vertical distance from the pivots of the separate shift levers to said link being shorter than the corresponding distance on the main shift lever, whereby upon shifting said main gear shift lever a similar and simultaneously shifting of said separate gear shift levers is effected to change the speed of said transmissions.

3. Shifting mechanism for shifting the gears of a plurality of transmissions to change the speed of said transmissions comprising a separate gear shift lever for each transmission, a main gear shift lever positioned between said other gear shift levers and for controlling the simultaneous shifting of the separate shift levers of each transmission, a pivot for each of said gear shift levers, said pivots being positioned in the same vertical plane the pivot for the main gear shift lever being offset vertically from the pivots for the other gear shift levers, a link supported by said gear shift levers, pivotal connections between said link and said separate gear shift levers, a swivel connection between said link and main gear shift lever whereby said link can swivel substantially only in a vertical plane, the distance from the pivot of the main shift lever to the link being greater than the corresponding distance on the separate shift levers, means along which said link can swivel upwardly and downwardly on said main gear shift lever as the several gear shift levers are swiveled about their respective pivots whereby upon shifting said main gear shift lever a similar and simultaneously shifting of said separate gear shift levers is effected to change the speed of said transmissions.

4. Shifting mechanism for shifting the gears of a plurality of transmissions to change the speed of said transmissions comprising a separate gear shift lever for each transmission, a main gear shift lever for controlling the simultaneous shifting of the separate shift levers of each transmission, a pivot for each of said gear shift levers, the pivot for the main gear shift lever being offset vertically from the pivots for the other gear shift levers, a rigid link, pivotal rotary connections between said link and said separate gear shift levers, and a shiftable pivotal connection between said link intermediate its ends and said main lever whereby said link can both swivel and shift on said main lever in a vertical plane only upwardly and downwardly on said main gear shift lever as the several gear shift levers are shifted about their respective pivots, the distance from the pivot of the main shift lever to the link being greater than the corresponding distance on the separate shift levers whereby upon shifting said main gear shift lever a similar and simultaneously shifting of said separate gear shift levers is effected to change the speed of said transmissions.

5. Shifting mechanism for shifting the gears of a plurality of transmissions to change the speed of said transmissions comprising a separate gear shift lever for each transmission, a main gear shift lever for controlling the simultaneous shifting of the separate shift levers of each transmission, a longitudinal slot in said main gear shift lever, a cross bar, a pin for supporting said cross bar on said main gear shift lever, said pin passing through said slot in the main gear shift lever whereby said cross bar can swivel and travel upwardly and downwardly in a substantially vertical plane, said cross bar having end portions rotatable about the longitudinal axis of said cross bar, a pivotal connection between the end portions of said cross bar and each of said transmission gear shift levers, pivotal supports for each of said gear shift levers, the pivotal support for the main gear shift lever being offset downwardly in a vertical plane from the pivotal supports for the said transmission gear shift levers whereby upon shifting said main gear shift lever a similar and simultaneous shifting of said separate gear shift levers is effected to change the speed of said transmissions.

6. Shifting mechanism for shifting the gears of at least two transmissions to change the speed of said transmissions, comprising a separate gear shift lever for each transmission, a main gear shift lever for controlling the simultaneous shifting of the separate shift levers of each transmission, fixed universal pivotal supports for the lower ends of each of said gear shift levers, said fixed pivotal supports being positioned in substantially the same vertical plane with the pivotal support for the main gear shift lever positioned between the other two pivotal supports and offset vertically from the pivotal supports for the two transmission gear shift levers, a cross bar having a sliding pivotal connection with the main gear shift lever and arranged to pivot only in a vertical plane passing through the above mentioned fixed pivotal supports and the main and separate gear shift levers, a pivotal connection between the cross bar and one of the separate gear shift levers on one side of the main gear shift lever and a pivotal connection between the other separate gear shift lever and the cross bar on the other side of the main gear shift lever whereby upon shifting said main gear shift lever a similar and simultaneous shifting of said separate gear shift levers is effected to change the speed of said transmissions.

7. The combination as set forth in claim 6 wheren the pivotal connections between the cross bar and the separate gear shift levers are spaced equidistant on opposite sides of the main gear shift lever and wherein the fixed pivotal support for the lower end of the main gear shift lever is positioned below the fixed pivotal supports for the separate gear shift levers.

8. The combination as set forth in claim 6 wherein the pivotal connections between the cross bar and the separate gear shift levers are spaced equidistant on opposite sides of the main gear shift lever and wherein the fixed pivotal support for the lower end of the main gear shift lever is positioned below the fixed pivotal supports for the separate gear shift levers and wherein the sliding pivotal connection between the main gear shift lever and the cross bar comprises a slot in the one member and a pin fixed on the other member and passing through said slot whereby the cross bar is free to move up and down on the main gear shift lever and swivel only in a vertical plane passing through the fixed pivotal supports for the main and separate gear shift levers.

JOSEPH BOYER.

REFERENCES CITED

The following references are of record in the file of this patent:

UNITED STATES PATENTS

| Number    | Name          | Date           |
|-----------|---------------|----------------|
| 1,775,754 | Fageol        | Sept. 16, 1930 |
| 1,863,972 | Eckland et al.| June 21, 1932  |
| 1,864,644 | Eckland et al.| June 28, 1932  |
| 2,132,450 | Wolf          | Oct. 11, 1938  |
| 2,205,589 | Bixby         | June 25, 1940  |
| 2,292,910 | Thornton      | Aug. 11, 1942  |
| 2,324,542 | Schon         | July 20, 1943  |

FOREIGN PATENTS

| Number  | Country  | Date          |
|---------|----------|---------------|
| 576,236 | Germany  | Aug. 30, 1931 |